(12) United States Patent
Tanaka

(10) Patent No.: US 10,082,656 B2
(45) Date of Patent: Sep. 25, 2018

(54) LAMELLAR BONE OBSERVATION MICROSCOPE

(71) Applicant: OLYMPUS CORPORATION, Hachioji-shi, Tokyo (JP)

(72) Inventor: Takaaki Tanaka, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 25 days.

(21) Appl. No.: 15/471,538

(22) Filed: Mar. 28, 2017

(65) Prior Publication Data

US 2017/0276921 A1   Sep. 28, 2017

(30) Foreign Application Priority Data

Mar. 28, 2016   (JP) ................... 2016-064726

(51) Int. Cl.
  *G02B 21/00*   (2006.01)
  *G02B 21/14*   (2006.01)
  *G02B 5/30*    (2006.01)
  *G02B 21/08*   (2006.01)
  *G02B 27/28*   (2006.01)

(52) U.S. Cl.
  CPC ....... *G02B 21/0092* (2013.01); *G02B 5/3083* (2013.01); *G02B 21/086* (2013.01); *G02B 21/14* (2013.01); *G02B 27/281* (2013.01)

(58) Field of Classification Search
  CPC ............ G02B 21/0004; G02B 21/0032; G02B 21/0092; G02B 5/3083; G02B 21/086; G02B 21/14; G02B 27/281
  USPC ......................... 359/370, 371, 386
  See application file for complete search history.

(56) References Cited

U.S. PATENT DOCUMENTS 5,499,053 A * 3/1996 Itoh .................. H04N 5/2251
                                              348/333.08
5,982,535 A * 11/1999 Inoue ................. G02B 21/26
                                              359/368

(Continued)

OTHER PUBLICATIONS

Hirokazu Hotani and Kazuhiko Kinosita, "Genkai o Koeru Seibutsukenbikyo: Mienai Mono o Miru" (Biological Microscope Beyond the Limit: Observe What You Cannot See), Gakkai Shuppan Center, Tokyo, 1991, p. 31.

(Continued)

*Primary Examiner* — Frank Font
(74) *Attorney, Agent, or Firm* — Holtz, Holtz & Volek PC

(57) ABSTRACT

A lamellar bone observation microscope includes: a light source; a condenser lens for focusing light emitted by the light source onto a sample; an objective lens on an opposite side of the sample from the condenser lens; a first polarizing plate between the light source and the condenser lens to pass only a polarization component of the light emitted by the light source; a second polarizing plate configured to pass only a polarization component of the light passed through the sample in accordance with a relative positional relationship with the first polarizing plate; a first wave plate between the first polarizing plate and the condenser lens to introduce a phase difference of $\lambda/4$ in a $\gamma$ direction of the light passed through the first polarizing plate; and a second wave plate for introducing a phase difference of $\lambda/4$ in a $\gamma$ direction of the light passed through the objective lens.

3 Claims, 18 Drawing Sheets
(7 of 18 Drawing Sheet(s) Filed in Color)

(56) References Cited

U.S. PATENT DOCUMENTS

| | | | | |
|---|---|---|---|---|
| 6,449,088 B1* | 9/2002 | Pettingell | G02B 21/10 | 359/371 |
| 8,830,573 B2* | 9/2014 | Cui | A61B 5/0059 | 359/368 |
| 2005/0152030 A1* | 7/2005 | Shribak | G01B 9/04 | 359/386 |
| 2010/0085637 A1* | 4/2010 | Liu | G02B 21/0092 | 359/386 |
| 2011/0085163 A1* | 4/2011 | Shin | G01N 21/21 | 356/300 |
| 2015/0029507 A1* | 1/2015 | Liu | G02B 27/62 | 356/327 |
| 2016/0154229 A1* | 6/2016 | Milner | G06T 7/80 | 348/79 |

OTHER PUBLICATIONS

Keiichi Tanaka and Kichizo Yamamoto, "Iyo HenkoKenbikyoho Nyumon" (Introduction to Medical Polarization Microscopy), Igaku-Shoin, Tokyo, 1974, p. 77.

\* cited by examiner

FIG.6

| | ROTATION ANGLE OF POLARIZER | | | |
|---|---|---|---|---|
| | | 0° | 0> $\theta_p$ >-45° | -45° |
| ROTATION ANGLE OF ANALYZER | 0° | CROSSED NICOL | | |
| | 0< $\theta_A$ <+45° | | INTERMEDIATE DIRECTION | |
| | +45° | | | PARALLEL NICOL |

T1

LAMELLAR BONE OBSERVATION MICROSCOPE

CROSS-REFERENCE TO RELATED APPLICATIONS

This application is based upon and claims the benefit of priority from Japanese Patent Application No. 2016-064726, filed on Mar. 28, 2016, the entire contents of which are incorporated herein by reference.

BACKGROUND

1. Technical Field

The disclosure relates to a lamellar bone observation microscope for observing a sample such as a bone section where retardation is very small.

2. Related Art

As an observation method by a polarization microscope, a technique has been known in which polarization property of a sample is measured by irradiating the sample with light polarized by a polarizer and causing the light passing through the sample to pass through a Senarmont compensator and an analyzer (see Keiichi Tanaka and Kichizo Yamamoto, "Iyo HenkoKenbikyoho Nyumon" (Introduction to Medical Polarization Microscopy), Igaku-Shoin, Tokyo, 1974, p. 77, and see also Hirokazu Hotani and Kazuhiko Kinosita, "Genkai o Koeru Seibutsukenbikyo: Mienai Mono o Miru" (Biological Microscope Beyond the Limit: Observe What You Cannot See), Gakkai Shuppan Center, Tokyo, 1991, p. 31). In this technique, an observer observes images of desired polarization contrast by rotating each of the polarizer, the Senarmont compensator, and the analyzer.

SUMMARY

In some embodiments, a lamellar bone observation microscope includes: a light source configured to emit light to irradiate a sample; a condenser lens disposed on an optical path of the light and configured to focus the light emitted by the light source onto the sample; an objective lens disposed on the optical path on an opposite side of the sample from the condenser lens; a first polarizing plate disposed on the optical path between the light source and the condenser lens, the first polarizing plate being rotatable around an optical axis of the condenser lens and configured to pass only a polarization component in one direction of the light emitted by the light source; a second polarizing plate disposed on the optical path on an output side of the objective lens, the second polarizing plate being rotatable around the optical axis of the condenser lens and configured to pass only a polarization component in one direction of the light that has passed through the sample in accordance with a relative positional relationship with the first polarizing plate; a first wave plate disposed on the optical path between the first polarizing plate and the condenser lens and configured to introduce a phase difference of $\lambda/4$ in a $\gamma$ direction of a component of the light that has passed through the first polarizing plate; and a second wave plate configured to introduce a phase difference of $\lambda/4$ in a $\gamma$ direction of a component of the light that has passed through the objective lens. The $\gamma$ directions of the first wave plate and the second wave plate are in parallel with each other. In a parallel Nicol state in which a vibration direction of the polarization component of the light passing through the first polarizing plate and a vibration direction of the polarization component of the light passing through the second polarizing plate are in parallel with each other, the first wave plate and the second wave plate are disposed on the optical path such that the $\gamma$ directions are inclined by an angle of 45 degrees with respect to each of the vibration direction of the first polarizing plate and the vibration direction of the second polarizing plate.

In some embodiments, a lamellar bone observation microscope includes: a light source configured to emit light to irradiate a sample; a condenser lens disposed on an optical path of the light and configured to focus the light emitted by the light source onto the sample; an objective lens disposed on the optical path on an opposite side of the sample from the condenser lens; a first polarizing plate disposed on the optical path between the light source and the condenser lens, the first polarizing plate being rotatable around an optical axis of the condenser lens and configured to pass only a polarization component in one direction of the light emitted by the light source; a second polarizing plate disposed on the optical path on an output side of the objective lens and configured to pass only a polarization component in one direction of the light that has passed through the sample in accordance with a relative positional relationship with the first polarizing plate; a first wave plate disposed on the optical path between the first polarizing plate and the condenser lens and configured to introduce a phase difference of $\lambda/4$ in a $\gamma$ direction of a component of the light that has passed through the first polarizing plate; and a Broce-Kohler compensator disposed on the optical path between the objective lens and the second polarizing plate, the Broce-Kohler compensator being rotatable around the optical axis of the condenser lens and configured to change retardation of the sample in accordance with a relative positional relationship with the second polarizing plate. In a parallel Nicol state in which a vibration direction of the polarization component of the light passing through the first polarizing plate and a vibration direction of the polarization component of the light passing through the second polarizing plate are in parallel with each other, the first wave plate is disposed on the optical path such that the $\gamma$ direction is inclined by an angle of 45 degrees with respect to each of the vibration direction of the first polarizing plate and the vibration direction of the second polarizing plate.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 is a table illustrating relationships between rotation angles and states of the polarizer and the analyzer of the lamellar bone observation microscope according to the first embodiment of the present invention;

DETAILED DESCRIPTION

Hereinafter, embodiments for carrying out the present invention will be described in detail with reference to the drawings. The present invention is not limited by the embodiments described below. In the description below, each drawing referred to in the description below merely schematically illustrates shapes, sizes, and positional relationships in a degree such that contents of the present invention can be understood. That is to say, the present invention is not limited to the sizes, the shapes, and the positional relationships illustrated in each drawing.

First Embodiment

Configuration of Lamellar Bone Observation Microscope

Figure 1:
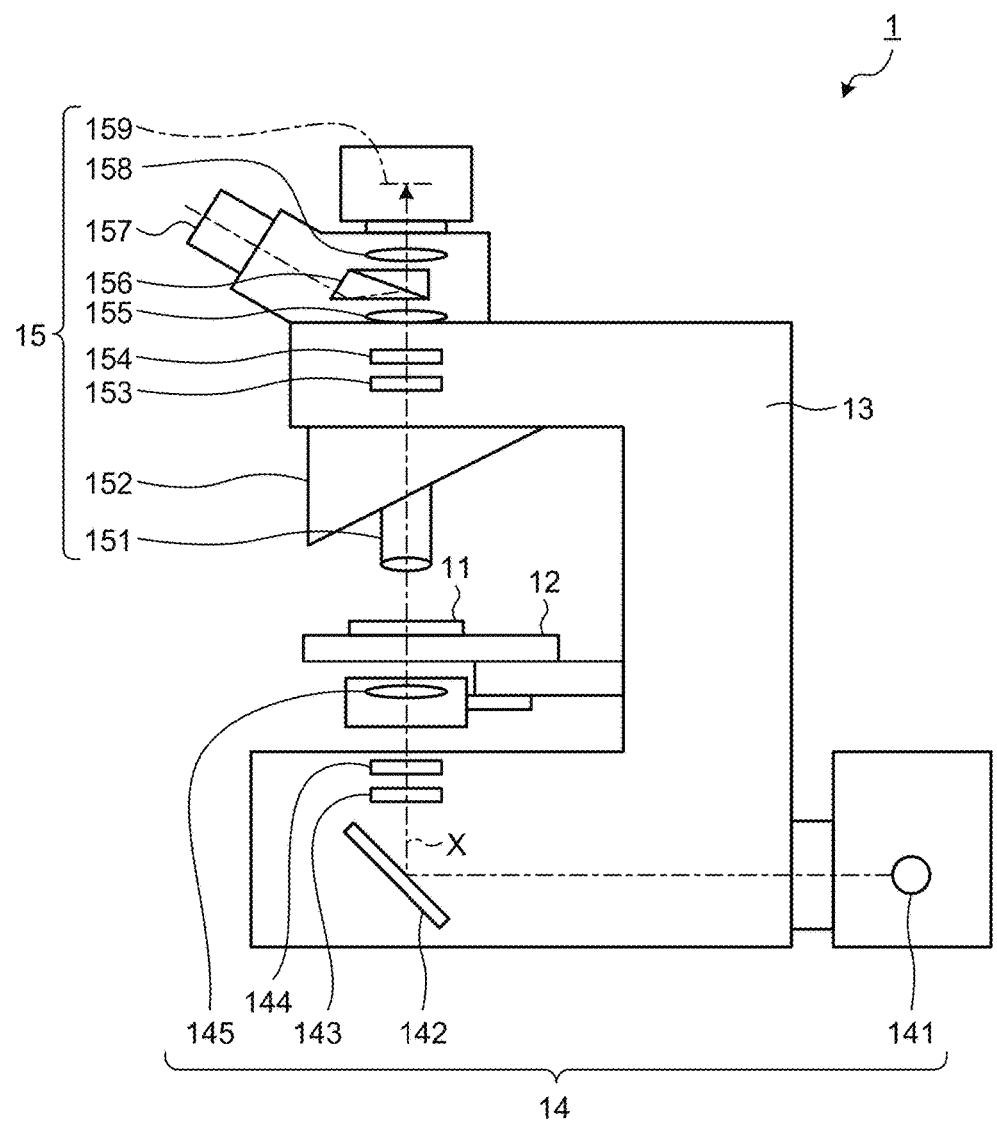
FIG. 1 is a schematic diagram illustrating a schematic configuration of a lamellar bone observation microscope according to a first embodiment of the present invention.

FIG. 1 is a schematic diagram illustrating a schematic configuration of a lamellar bone observation microscope (lamellar bone microscope) according to a first embodiment of the present invention. A lamellar bone observation microscope 1 illustrated in FIG. 1 includes an XY stage 12 that supports a preparation 11 on which a sample is mounted and can move in a horizontal direction, a microscope main body unit 13 that holds the XY stage 12, an illumination optical system 14 that irradiates the sample with illumination light, and an observation optical system 15 that observes the sample. In the first embodiment, as the sample, a bone section will be described as an example which has a very small retardation.

The illumination optical system 14 includes a light source unit 141, a mirror 142, a polarizer 143, a first wave plate 144, and a condenser lens 145. In the illumination optical system 14, the mirror 142, the polarizer 143, the first wave plate 144, and the condenser lens 145 are arranged in this order from the light source unit 141.

The light source unit 141 emits light to irradiate a sample. The light source unit 141 includes a light source which is configured by using a halogen lamp, a xenon lamp, an LED (Light Emitting Diode), or the like to emit light, and includes a lens group that condenses the light emitted by the light source and converts the light into collimated light.

The mirror 142 reflects light emitted from the light source unit 141, to the polarizer 143. A plurality of relay lenses may be provided on an optical path between the mirror 142 and the light source unit 141.

The polarizer 143 is rotatable around an optical axis X of the condenser lens 145 and disposed on an optical path between the condenser lens 145 and the mirror 142. The polarizer 143 passes only a polarization component in one direction of the illumination light emitted by the light source unit 141. Specifically, the polarizer 143 polarizes the illumination light emitted from the light source unit 141 into linearly polarized light. The polarizer 143 is configured by using a polarizing plate which is one of optical elements such as a filter. On the outer circumference of the polarizer 143, there is information indicating an angle (for example, 45 degrees) of vibration direction with respect to the optical axis X. For example, there is a mark, a line, or printed characters. Of course, the information may be provided for each predetermined angle (for example, 5 degrees or 10 degrees). In the first embodiment, the polarizer 143 functions as a first polarizing plate.

The first wave plate 144 is configured by using a quarter-wave plate. The first wave plate 144 is disposed on an optical path between the polarizer 143 and the condenser lens 145. The polarizer 143 is disposed on the optical path such that a γ direction is inclined by an angle of 45 degrees with respect to each of a vibration direction of the polarizer 143 and a vibration direction of an analyzer 154 described later when a parallel Nicol state is established in which a vibration direction of a polarization component of the light passing through the polarizer 143 and a vibration direction of a polarization component of the light passing through the analyzer 154 are in parallel with each other. The first wave plate 144 introduces a phase difference of λ/4 (90 degrees) in the γ direction of a component of the light that has passed through the polarizer 143. For example, the first wave plate 144 converts linearly polarized light that has passed through the polarizer 143 into circularly polarized light.

The condenser lens 145 focuses the light that has passed through the first wave plate 144 to uniformly irradiate a region including a sample on the preparation 11 with the focused light. The condenser lens 145 may be provided with a field stop that can adjust the amount of light emitted from the light source unit 141 and a field stop operating unit that changes the diameter of the field stop.

The observation optical system 15 includes an objective lens 151, a revolver 152, a second wave plate 153, an analyzer 154, a tube lens 155, a prism 156, an eyepiece 157, a relay lens 158, and an imaging unit 159. In the observation optical system 15, the objective lens 151, the revolver 152, the second wave plate 153, the analyzer 154, the tube lens 155, the prism 156, and the eyepiece 157 are arranged in this order from the sample.

The objective lens 151 is located on the optical path on the opposite side of the sample from the condenser lens 145. The objective lenses 151 having different magnifications from each other (for example, 10 times, 50 times, and 100 times) are attached to the revolver 152.

A plurality of objective lenses 151 are detachably attached to the revolver 152. The revolver 152 is rotatable around the optical path and disposed above the sample. The revolver 152 is made by using, for example, a swing revolver.

The second wave plate 153 is configured by using a quarter-wave plate. The second wave plate 153 is disposed on an optical path between the analyzer 154 and the objective lens 151. The second wave plate 153 is disposed on the optical path such that the γ direction is inclined by an angle of 45 degrees with respect to each of the vibration direction of the polarizer 143 and the vibration direction of the analyzer 154 when the parallel Nicol state is established in which the vibration direction of the polarization component of the light passing through the polarizer 143 and the vibration direction of the polarization component of the light passing through the analyzer 154 are in parallel with each other. The second wave plate 153 introduces a phase difference of λ/4 (90 degrees) in the γ direction of a component of the light that has passed through the objective lens 151. The second wave plate 153 and the first wave plate 144 are arranged to be fixed on the optical path so that the γ directions of both wave plates are in parallel with each other.

The analyzer 154 is rotatable around the optical axis X of the condenser lens 145 and disposed on an optical path between the second wave plate 153 and the tube lens 155. The analyzer 154 passes only a polarization component in one direction of the light that has passed through the second wave plate 153. The analyzer 154 is rotatable around the optical axis X of the condenser lens 145. The analyzer 154 is configured by using a polarizing plate which is one of optical elements such as a filter. On the outer circumference of the analyzer 154, there is a mark indicating a predetermined angle (for example, 45 degrees) with respect to the optical axis X. In the first embodiment, the analyzer 154 functions as a second polarizing plate.

The tube lens 155 condenses the light that has passed through the analyzer 154 to form an observation image. The tube lens 155 includes one or more lenses.

The prism 156 divides light of the observation image formed by the tube lens 155 into light to an imaging unit and light to the eyepiece 157. The prism 156 is provided with coating on a junction surface for dividing the light.

The eyepiece 157 enlarges the observation image inputted through the prism 156. The eyepiece 157 includes one or more lenses.

The relay lens 158 relays light from the prism 156 to the imaging unit 159. The relay lens 158 includes one or more lenses.

The imaging unit 159 generates image data of the sample by receiving the observation image of the sample inputted through the relay lens 158 and performing photoelectric conversion, and outputs the image data to a display monitor not illustrated in the drawings. The imaging unit 159 includes an image sensor such as CCD (Charge Coupled Device) or CMOS (Complementary Metal Oxide Semiconductor).

Figure 2:
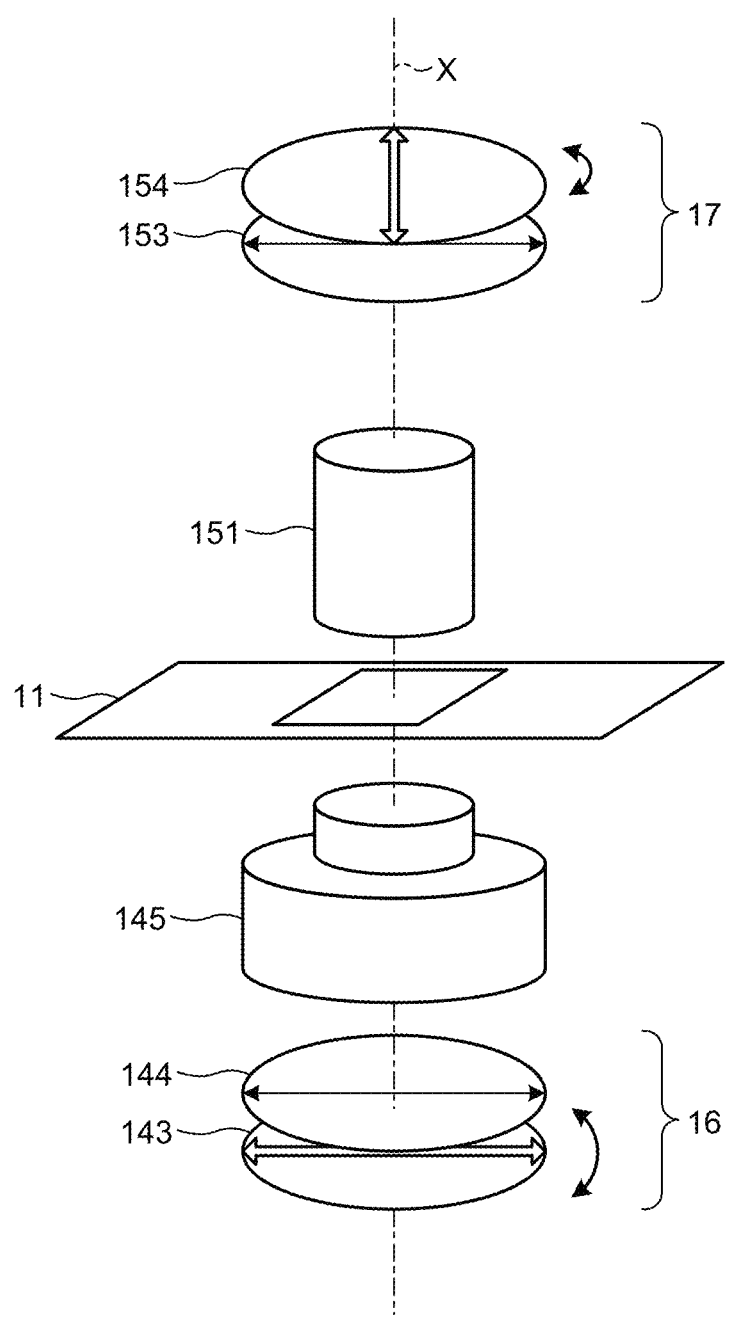
FIG. 2 is a schematic view illustrating a part of the lamellar bone observation microscope according to the first embodiment of the present invention.

As illustrated in FIG. 2, the lamellar bone observation microscope 1 configured as described above configures an illumination side Senarmont compensator 16 by the polarizer 143 and the first wave plate 144 and an observation side Senarmont compensator 17 by the analyzer 154 and the second wave plate 153. Further, the γ direction of the first wave plate 144 and the second wave plate 153 is fixed to an east-west direction (a left-right direction in FIG. 2) with respect to an observer (the optical axis X). Further, the polarizer 143 is rotatable with respect to the optical axis X of the condenser lens 145 while defining the east-west direction as a reference position (0 degrees) of the vibration direction. Furthermore, the analyzer 154 is rotatable with respect to the optical axis X of the condenser lens 145 while defining the south-north direction (the vertical direction in FIG. 2) as a reference position (0 degrees) of the vibration direction.

The lamellar bone observation microscope 1 described above includes the illumination side Senarmont compensator 16 and the observation side Senarmont compensator 17, so that the lamellar bone observation microscope 1 can illuminate the sample with any of linearly polarized light, elliptically polarized light, or circularly polarized light. Specifically, the observer can polarize the illumination light into one of the linearly polarized light, the elliptically polarized light, and the circularly polarized light by rotating the polarizer 143 of the illumination side Senarmont compensator 16 by ±45 degrees from the reference position (0 degrees), and further can change the retardation in a range of 0 to 137 nm. In this case, the observer can cancel the retardation on the illumination side by a law of subtraction by rotating the analyzer 154 of the observation side Senarmont compensator 17 by 45 degrees from the reference position. In the description below, the method as described above is referred to as a duplex Senarmont method. By the duplex Senarmont method, the observer can change the light emitted to the sample from left elliptically polarized light to circularly polarized light by rotating the polarizer 143 by −45 degrees from the reference position (clockwise rotation with respect to the optical axis X). Further, the observer can change the observation light from right elliptically polarized light to circularly polarized light by rotating the analyzer 154 by +45 degrees from the reference position (counterclockwise rotation with respect to the optical axis X).

Observation Procedure

Figure 3:
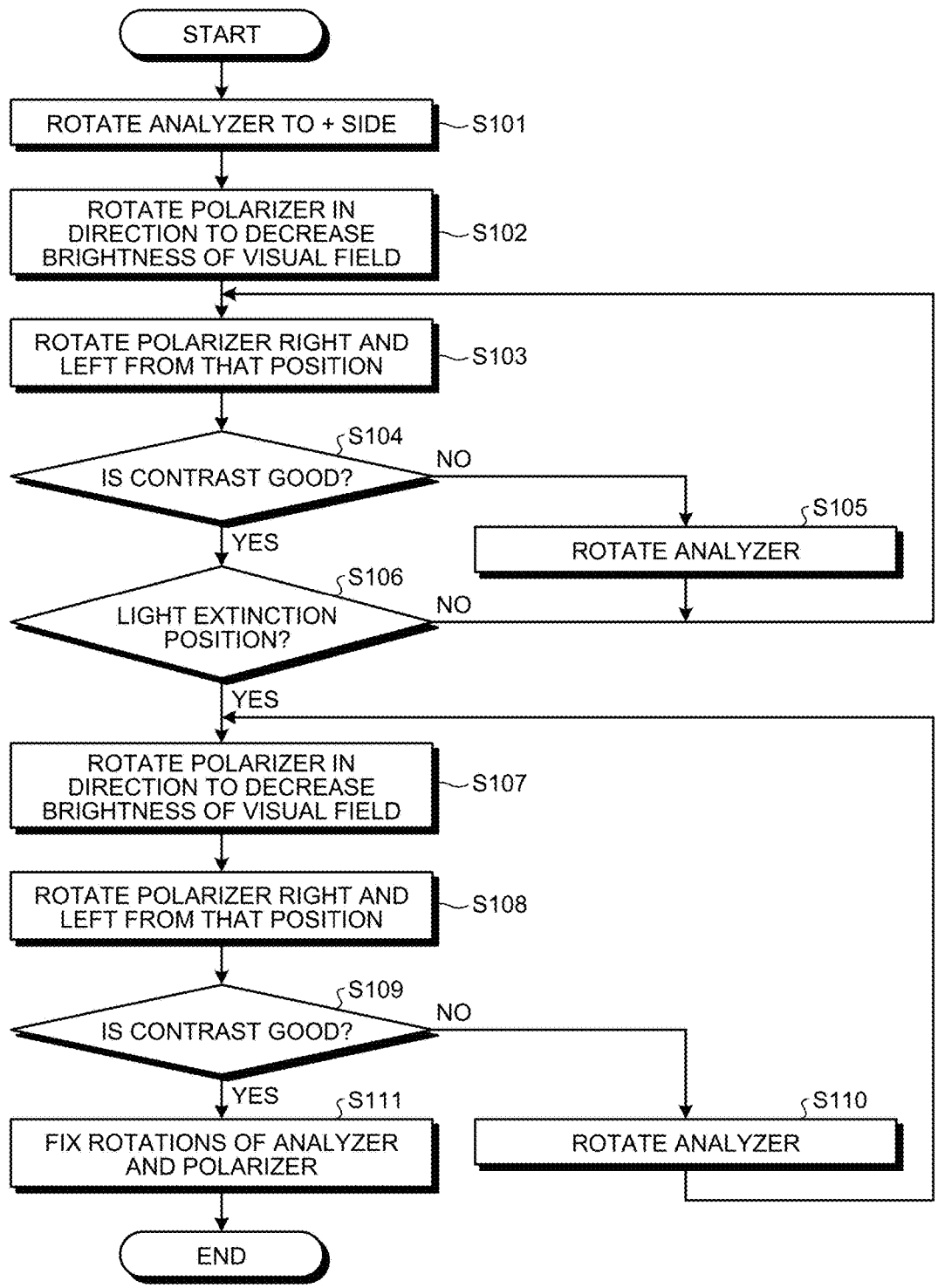
FIG. 3 is a flowchart illustrating an outline of an observation procedure by the lamellar bone observation microscope according to the first embodiment of the present invention.
Figure 4A:
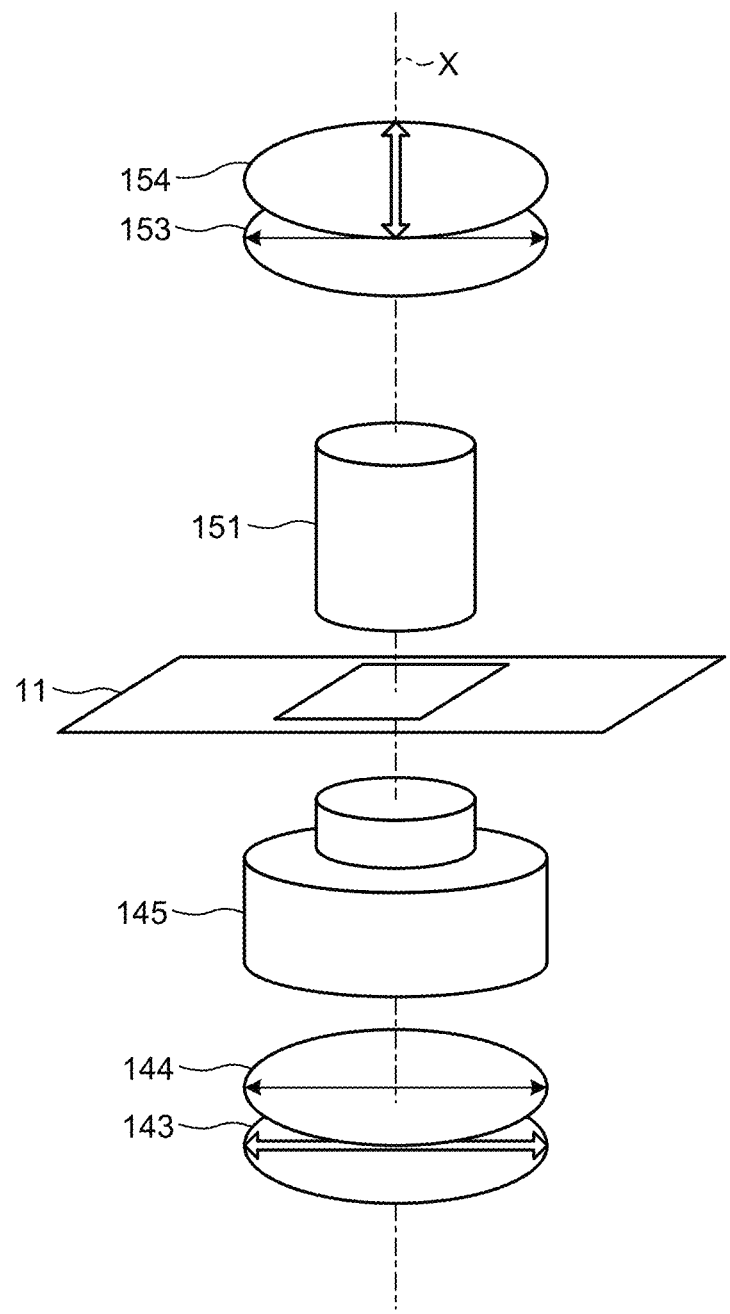
FIG. 4A is a diagram schematically illustrating a vibration direction of each unit in a duplex Senarmont method by the lamellar bone observation microscope according to the first embodiment of the present invention.
Figure 4B:
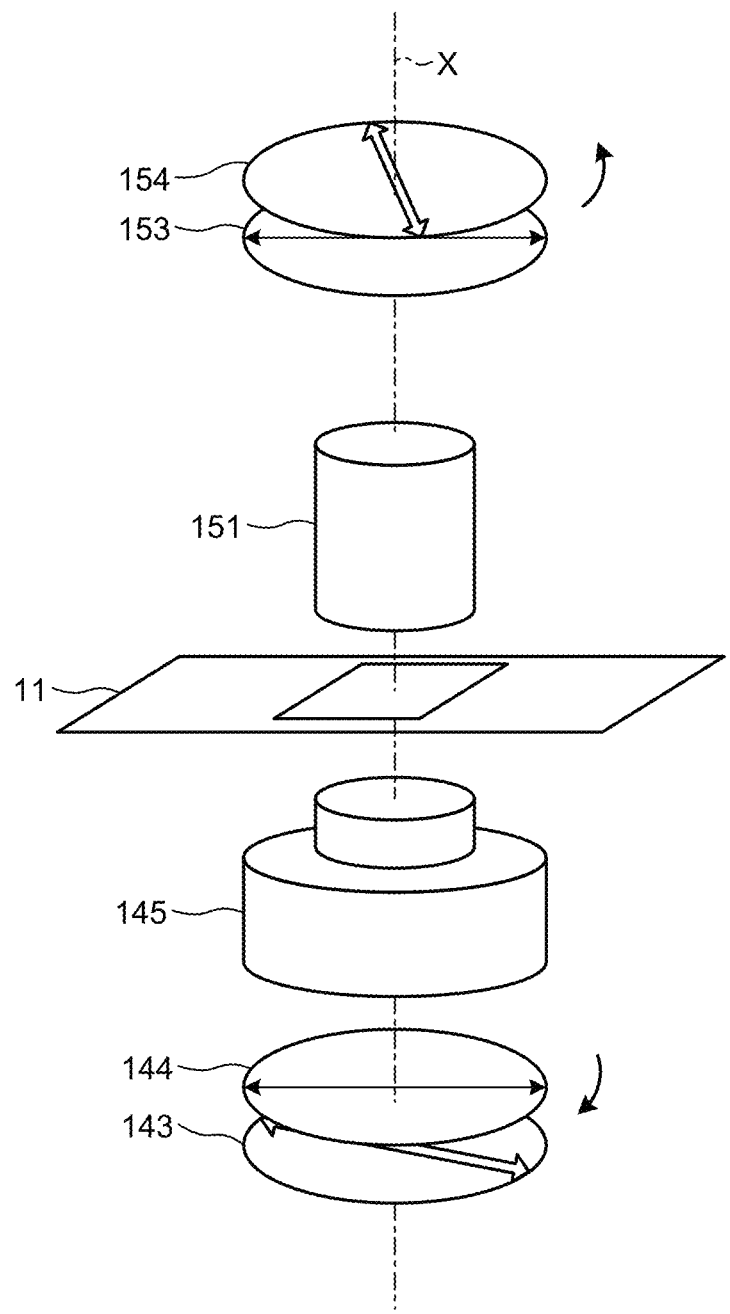
FIG. 4B is a diagram schematically illustrating a vibration direction of each unit in the duplex Senarmont method by the lamellar bone observation microscope according to the first embodiment of the present invention.
Figure 4C:
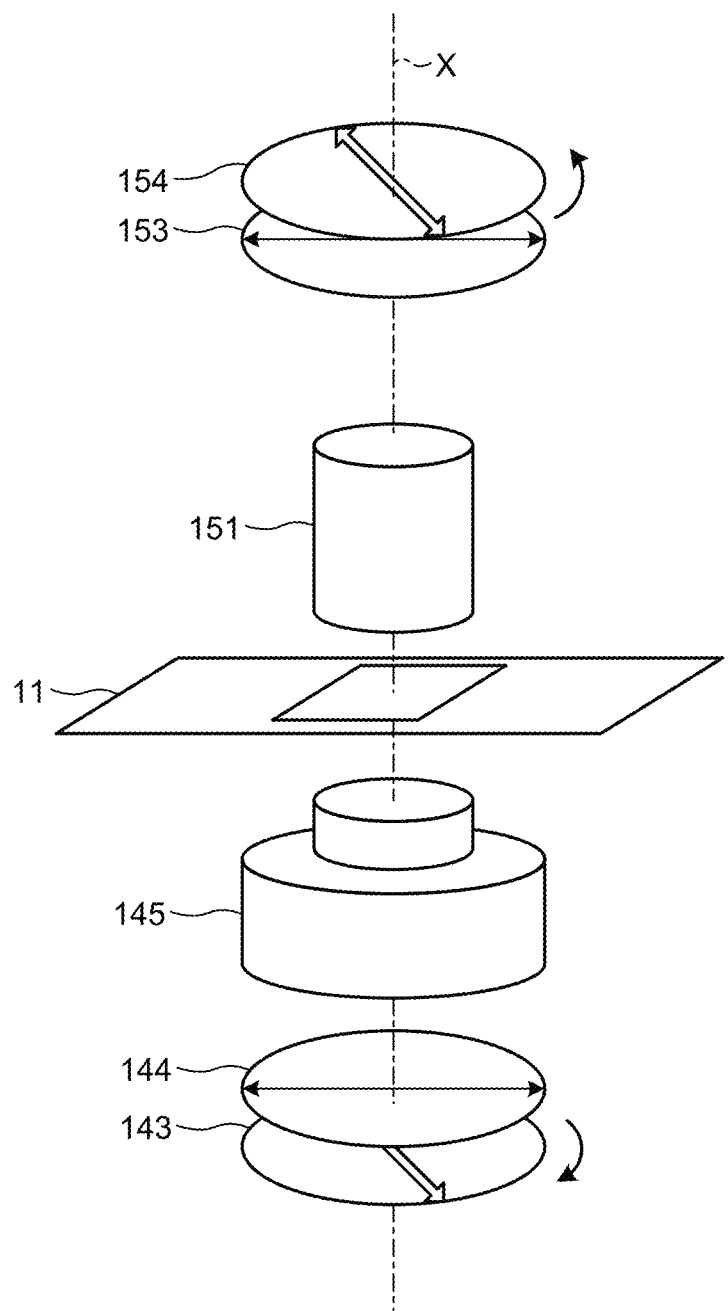
FIG. 4C is a diagram schematically illustrating a vibration direction of each unit in the duplex Senarmont method by the lamellar bone observation microscope according to the first embodiment of the present invention.
Figure 5A:
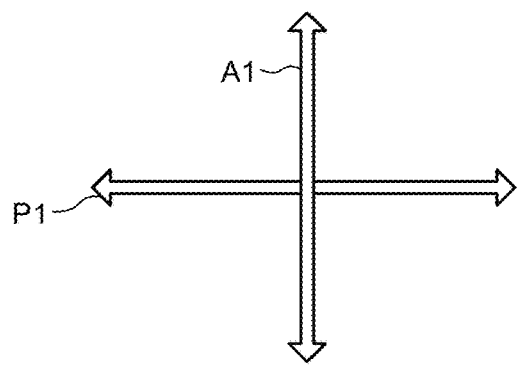
FIG. 5A is a diagram schematically illustrating vibration directions of a polarizer and an analyzer of the lamellar bone observation microscope according to the first embodiment of the present invention.
Figure 5B:
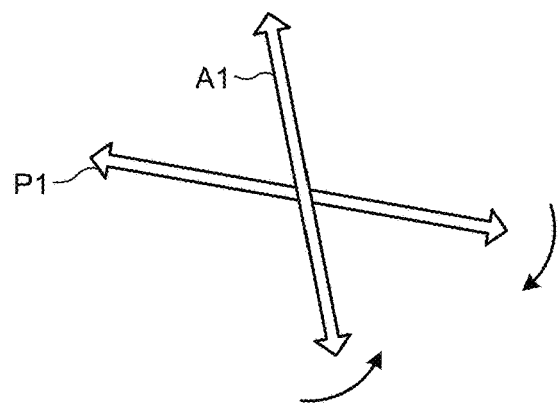
FIG. 5B is a diagram schematically illustrating vibration directions of the polarizer and the analyzer of the lamellar bone observation microscope according to the first embodiment of the present invention.
Figure 5C:
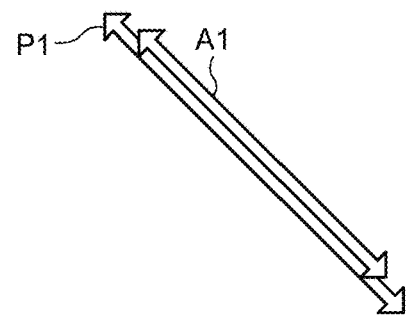
FIG. 5C is a diagram schematically illustrating vibration directions of the polarizer and the analyzer of the lamellar bone observation microscope according to the first embodiment of the present invention.

Next, an observation procedure of the duplex Senarmont method by the lamellar bone observation microscope 1 will be described. FIG. 3 is a flowchart illustrating an outline of the observation procedure of the duplex Senarmont method by the lamellar bone observation microscope 1. FIGS. 4A to 4C are diagrams schematically illustrating a vibration direction of each unit in the duplex Senarmont method by the lamellar bone observation microscope 1. FIGS. 5A to 5C are diagrams schematically illustrating vibration directions of the polarizer 143 and the analyzer 154. In FIGS. 3, 4A to 4C, and 5A to 5C, a bone section is observed as a sample. It is assumed that the light emitted by the light source unit 141 is white light. Further, in FIGS. 5A to 5C, an arrow P1 indicates a polarizing direction of the polarizer 143 and an arrow A1 indicates a polarizing direction of the analyzer 154.

As illustrated in FIG. 3, first, the observer rotates the analyzer 154 to + side by several degrees from the reference position from a state of crossed Nicol in which the vibration direction of the polarizer 143 and the vibration direction of the analyzer 154 are orthogonal to each other (see FIGS. 4A and 5A) (step S101). Thus, a visual field observed by the observer becomes bright.

Subsequently, the observer rotates the polarizer 143 in a direction to decrease the brightness of the visual field from the reference position (step S102). Specifically, as illustrated in FIGS. 4B and 5B, the observer slightly rotates the polarizer 143 in a direction to decrease the brightness of the visual field from the reference position.

Thereafter, the observer slightly rotates the polarizer 143 right and left from that position and observes changes of contrast of an observation image (step S103), and when the contrast of the observation image is good (step S104: Yes), the observer proceeds to step S106 described below. On the other hand, when the contrast of the observation image is not good (step S104: No), the observer rotates the analyzer 154 by several more degrees (step S105). After step S105, the observer returns to step S103, and the observer rotates the polarizer 143 and the analyzer 154 until the contrast of the observation image becomes good.

In step S106, the observer determines whether or not the observation image is at a light extinction position. Specifically, when light extinction does not occur even when rotating the polarizer 143 and the visual field of the observation image becomes sensitive color as the rotation angle of the analyzer 154 is increased by rotating the analyzer 154, the observer assumes that light extinction ($\lambda=546$ nm) occurs. At this time, the illumination side Senarmont compensator 16 and the observation side Senarmont compensator 17, which are vertically located, become circularly polarizing plates, and a state occurs in which light of $\lambda=546$ nm is extinguished. When the observer determines that the observation image is at the light extinction position (step S106: Yes), the observer proceeds to step S107. On the other hand, when the observer determines that the observation image is not at the light extinction position (step S106: No), the observer returns to step S103 and rotates the polarizer 143 and the analyzer 154 until the observation image reaches the extinction position.

In step S107, the observer rotates the polarizer 143 in a direction to decrease the brightness of the visual field.

Subsequently, the observer slightly rotates the polarizer 143 right and left from that position and observes changes of contrast of the observation image (step S108), and when the contrast of the observation image is good (step S109: Yes), the observer proceeds to step S111 described below. On the other hand, when the contrast of the observation image is not good (step S109: No), the observer rotates the analyzer 154 by several more degrees (step S110). After step S110, the observer returns to step S107, and the observer rotates the polarizer 143 and the analyzer 154 until the contrast of the observation image becomes good while rotating the polarizer 143.

In step S111, the observer fixes the rotations of the analyzer 154 and the polarizer 143. Specifically, as illustrated in FIGS. 4C and 5C, the upper limit of rotation of the analyzer 154 is a position of +45 degrees from the reference position and the limit of rotation of the polarizer 143 is a position of −45 degrees from the reference position (parallel Nicol state). More specifically, as illustrated in a table T1 in FIG. 6, the illumination side Senarmont compensator 16 and the observation side Senarmont compensator 17, which are vertically located, become circularly polarizing plates, and a state occurs in which light of $\lambda=546$ nm is extinguished. After step S111, the procedure ends and the sample is observed. In this manner, when Z' direction of the sample is the same as the γ direction of each of the first wave plate 144 and the second wave plate 153, an interference color of addition (blue) is shown and when the Z' direction is perpendicular to the γ direction, an interference color of subtraction (yellow) is shown. When the observer performs bright field observation or fluorescence observation, the observer causes the analyzer 154, the polarizer 143, the first wave plate 144, and the second wave plate 153 to retract from the optical path.

Comparison of Interference Fringes

Figure 7:
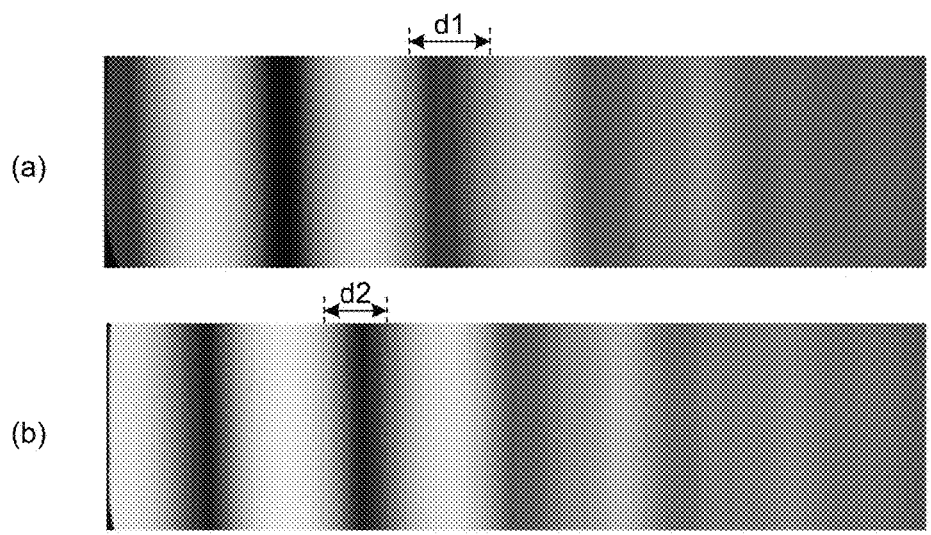
FIG. 7 is an image of interference fringes of white light of each of crossed Nicol and parallel Nicol by the lamellar bone observation microscope according to the first embodiment of the present invention.

Next, an interference fringe of each of crossed Nicol and parallel Nicol by the lamellar bone observation microscope 1 will be described. FIG. 7 is an image of the interference fringes of white light of each of crossed Nicol and parallel Nicol by the lamellar bone observation microscope 1. (a) of FIG. 7 illustrates an interference fringe that can be observed when the polarizer 143 and the analyzer 154 are in the crossed Nicol state. (b) of FIG. 7 illustrates an interference fringe that can be observed when the polarizer 143 and the analyzer 154 are in the parallel Nicol state. In the description of FIG. 7, it is assumed that the sample is a quartz wedge and the light emitted by the light source unit 141 is white light.

As illustrated in FIG. 7, regarding a range d1 of retardation (R) corresponding to a primary interference fringe, in the case of crossed Nicol, the center of primary interference color is R=A (see (a) of FIG. 7). On the other hand, regarding a range d2 of retardation (R) corresponding to a primary interference fringe, in the case of parallel Nicol, the center of primary interference color is R=$\lambda$/2 (see (b) of FIG. 7), which is about ½ of that in the crossed Nicol.

Figure 8:
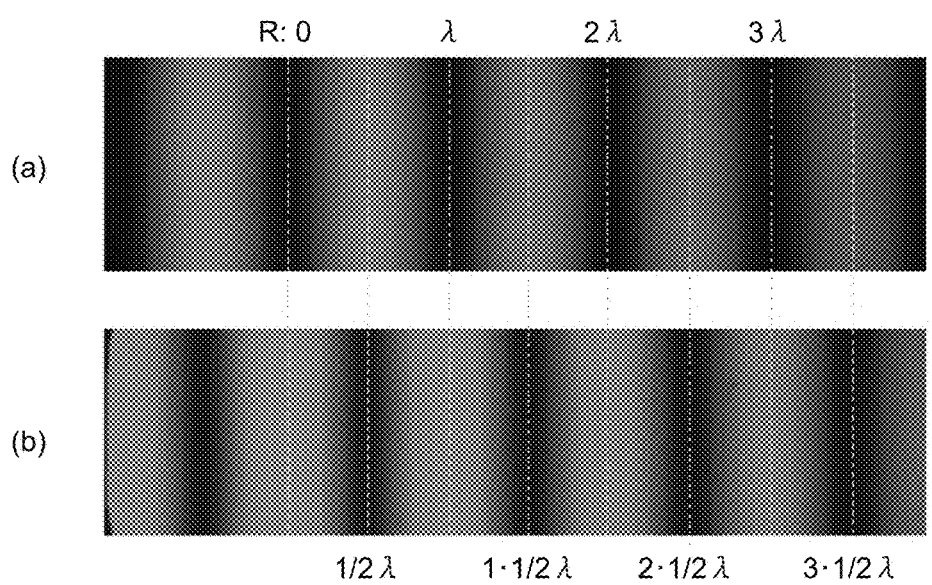
FIG. 8 is an image of interference fringes of monochromatic light of each of crossed Nicol and parallel Nicol by the lamellar bone observation microscope according to the first embodiment of the present invention.

FIG. 8 is an image of interference fringes of monochromatic light of each of crossed Nicol and parallel Nicol by the lamellar bone observation microscope 1. (a) of FIG. 8 illustrates another interference fringe that can be observed when the polarizer 143 and the analyzer 154 are in the crossed Nicol state. (b) of FIG. 8 illustrates an interference fringe that can be observed when the polarizer 143 and the analyzer 154 are in the parallel Nicol state. In the description of FIG. 8, it is assumed that the sample is a quartz wedge and the light emitted by the light source unit 141 is monochromatic light of 546 nm.

As illustrated in FIG. 8, the lamellar bone observation microscope 1 extinguishes light by retardation (R) of an integral multiple of half wavelength (($\lambda$/2)×n (n=natural number)) when the polarizer 143 and the analyzer 154 are in the parallel Nicol state and extinguishes light by retardation (R) of an integral multiple of $\lambda$ when the polarizer 143 and the analyzer 154 are in the crossed Nicol state (see (a) and (b) of FIG. 8).

In this manner, the lamellar bone observation microscope 1 can create an interference color chart corresponding to retardation of the sample when the polarizer 143 and the analyzer 154 are in the parallel Nicol state. Further, retardation of primary interference color is located at $\lambda$/2. Further, the sensitive color of the lamellar bone observation microscope 1 is located at a position of $\lambda$/2, and the width of the primary interference color (from yellow to blue) is about a half of that of crossed Nicol. Furthermore, the lamellar bone observation microscope 1 extinguishes light by retardation of $\lambda$/2 of wavelength to an integral multiple of $\lambda$ when the polarizer 143 and the analyzer 154 are in the parallel Nicol state and extinguishes light by retardation of an integral multiple of $\lambda$ when the polarizer 143 and the analyzer 154 are in the crossed Nicol state.

Observation Image of Bone Section

Figure 9A:
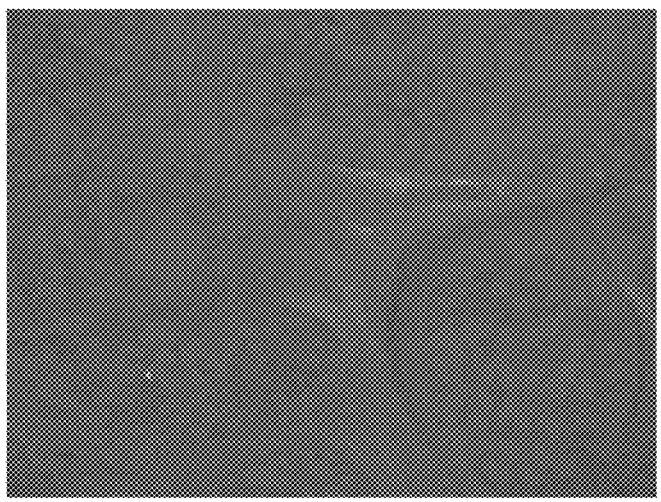
FIG. 9A is an image of a bone section when the polarizer and the analyzer are located in an intermediate direction from a reference position in the duplex Senarmont method by the lamellar bone observation microscope according to the first embodiment of the present invention.
Figure 9B:
FIG. 9B is an image of a bone section when contrast is changed by slightly rotating the analyzer from a state in which the polarizer and the analyzer are in a parallel Nicol state by the lamellar bone observation microscope according to the first embodiment of the present invention.
Figure 9C:
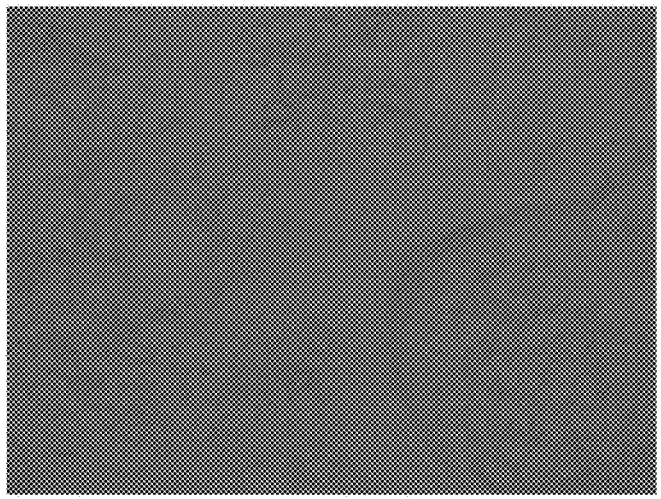
FIG. 9C is an image of a bone section when using a sensitive color plate where the retardation is 530 nm in a crossed Nicol sensitive color observation by a conventional polarization microscope.

Next, an observation image when a bone section is observed as a sample by using the lamellar bone observation microscope 1 will be described. FIG. 9A is an image of a bone section when the polarizer 143 and the analyzer 154 are located in an intermediate direction from a reference position in the duplex Senarmont method. FIG. 9B is an image of a bone section when contrast is changed by slightly rotating the analyzer 154 from a state in which the polarizer 143 and the analyzer 154 are in the parallel Nicol state. FIG. 9C is an image of a bone section when using a sensitive color plate where the retardation is 530 nm in a crossed Nicol sensitive color observation by a conventional polarization microscope.

As illustrated in FIG. 9B, in the duplex Senarmont method, it is possible to easily observe a lamellar structure of a bone section by color contrast.

Observation Image of Chrysotile

Figure 10A:
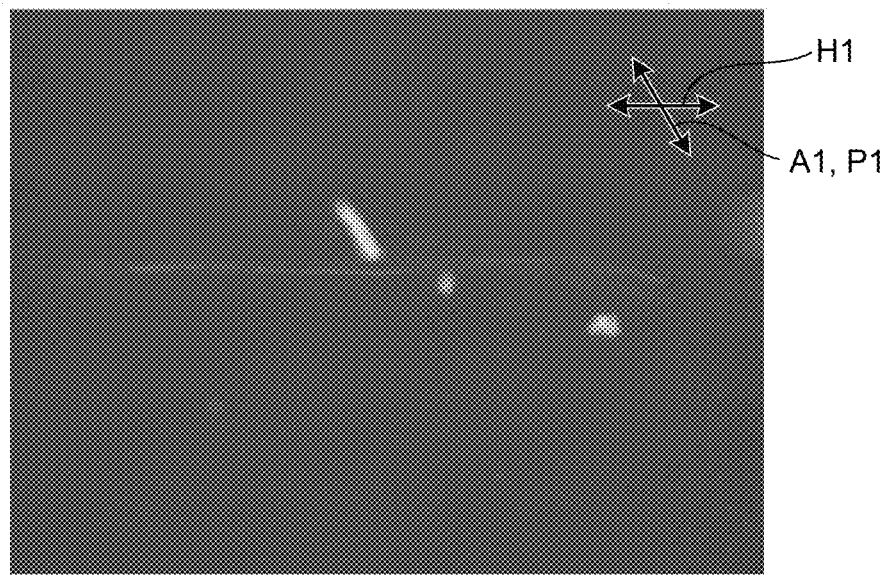
FIG. 10A is an image of a chrysotile observed when the polarizer and the analyzer are in a parallel Nicol state in the duplex Senarmont method by the lamellar bone observation microscope according to the first embodiment of the present invention.
Figure 10B:
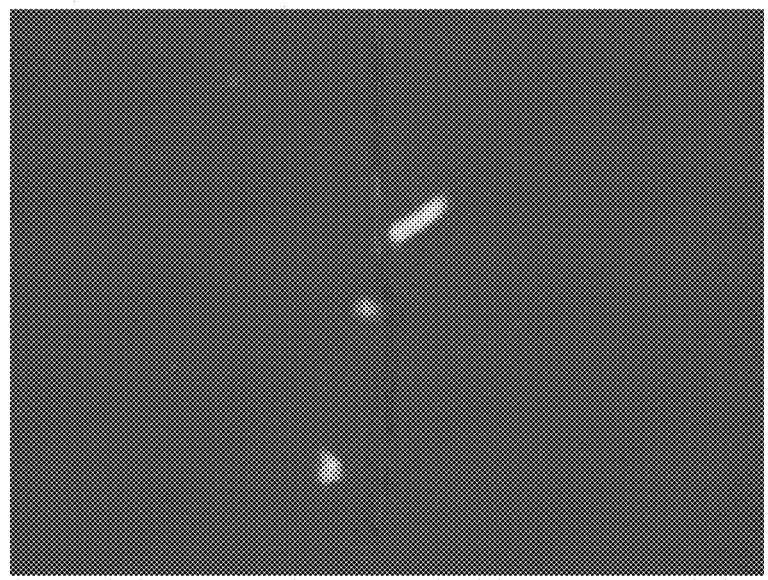
FIG. 10B is an image of another chrysotile observed when the polarizer and the analyzer are in a parallel Nicol state in the duplex Senarmont method by the lamellar bone observation microscope according to the first embodiment of the present invention.
Figure 10C:
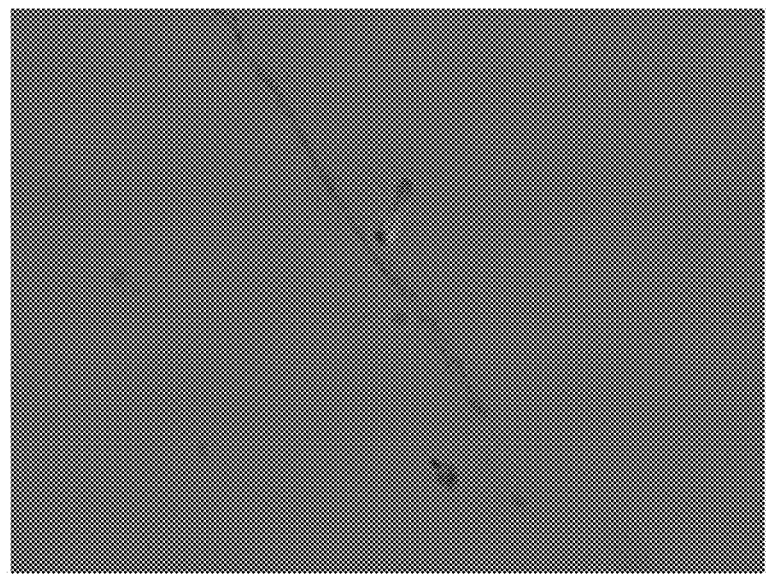
FIG. 10C is an image of a chrysotile observed in the crossed Nicol sensitive color observation by the conventional polarization microscope.
Figure 10D:
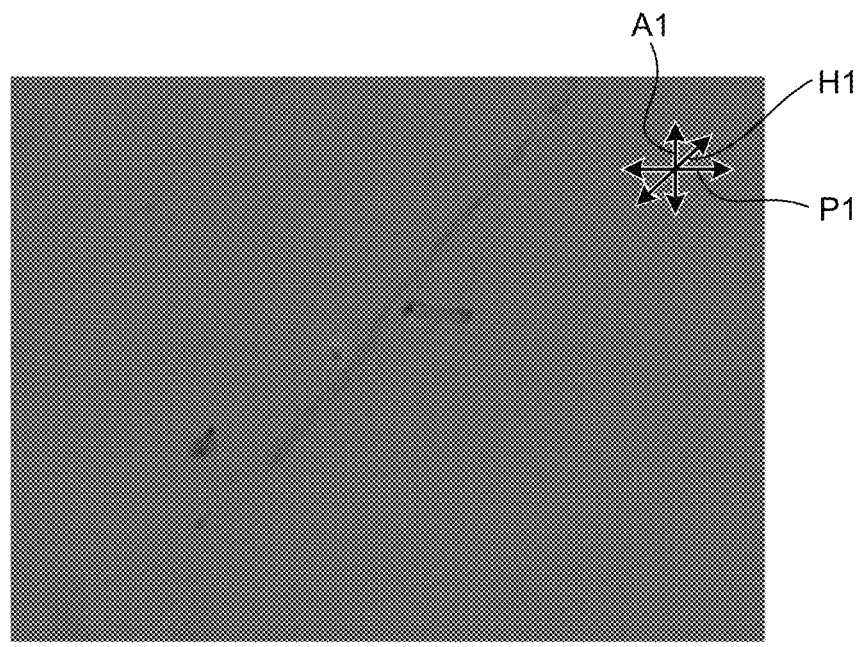
FIG. 10D is an image of another chrysotile observed in the crossed Nicol sensitive color observation by the conventional polarization microscope.

Next, an observation image when a chrysotile (asbestos) is observed as a sample by using the lamellar bone observation microscope 1 will be described. FIG. 10A is an image of a chrysotile observed when the polarizer 143 and the analyzer 154 are in the parallel Nicol state in the duplex Senarmont method. FIG. 10B is an image of another chrysotile observed when the polarizer 143 and the analyzer 154 are in the parallel Nicol state in the duplex Senarmont method. FIG. 10C is an image of a chrysotile observed in the crossed Nicol sensitive color observation (using a 530 nm wave plate). FIG. 10D is an image of another chrysotile observed in the crossed Nicol sensitive color observation. In FIGS. 10A and 10B, the arrow P1 indicates the vibration direction of the polarizer 143, the arrow A1 indicates the vibration direction of the analyzer 154, and the arrow H1 indicates the $\gamma$ direction of each of the first wave plate 144 and the second wave plate 153. In FIGS. 10C and 10D, the arrow P1 indicates the vibration direction of the polarizer 143, the arrow A1 indicates the vibration direction of the analyzer 154, and the arrow H1 indicates the $\gamma$ direction of the sensitive color plate.

As illustrated in FIGS. 10A to 10C, in the duplex Senarmont method, it is possible to obtain an observation image with a strong color contrast from a thin asbestos fiber with a small retardation.

Conoscopic Image

Figure 11A:
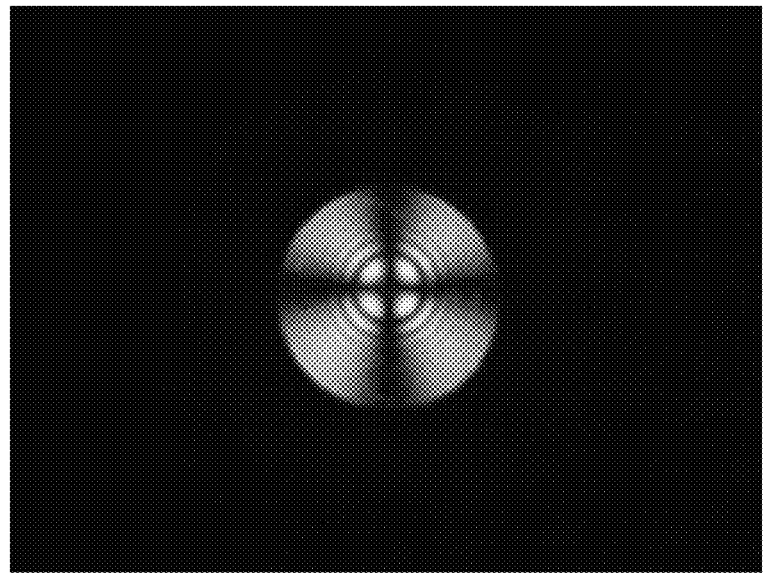
FIG. 11A is a conoscopic image observed by the conventional polarization microscope when a polarizer and an analyzer are in a crossed Nicol state.
Figure 11B:
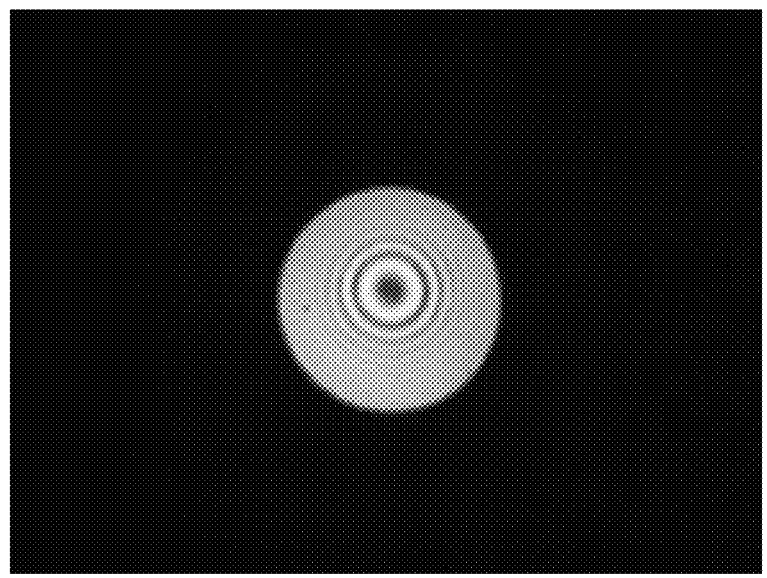
FIG. 11B is a conoscopic image observed when the polarizer and the analyzer are in the parallel Nicol state in the duplex Senarmont method by the lamellar bone observation microscope according to the first embodiment of the present invention.

Next, an observation of a conoscopic image using the lamellar bone observation microscope 1 will be described. FIG. 11A is a conoscopic image observed by the conventional polarization microscope when the polarizer 143 and the analyzer 154 are in the crossed Nicol state. FIG. 11B is a conoscopic image observed when the polarizer 143 and the analyzer 154 are in the parallel Nicol state in the duplex Senarmont method. In FIGS. 11A and 11B, calcite (uniaxial, negative crystal) is used as the sample.

As illustrated in FIGS. 11A and 11B, the conoscopic image in FIG. 11B illustrates a primary interference color at an optical axis portion (central portion) as compared with the conoscopic image by the conventional crossed Nicol (see FIG. 11A), so that the observer can easily determine that the sample is a negative crystal (see FIG. 11B). Thus, the observer can observe a polarization interference image without isogyre.

Figure 12A:
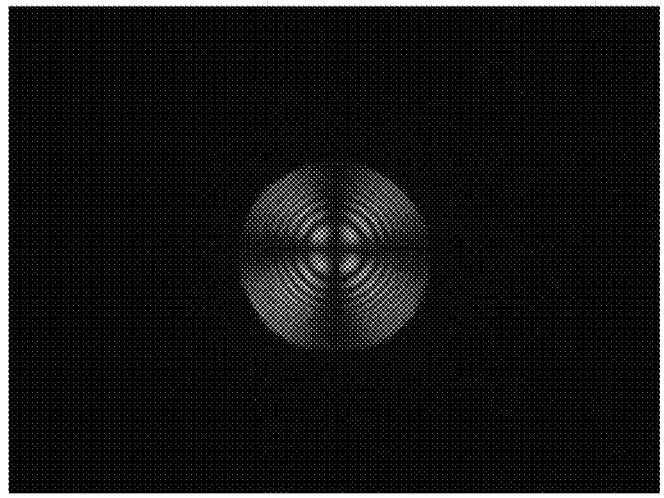
FIG. 12A is a conoscopic image observed by the conventional polarization microscope when the polarizer and the analyzer are in the crossed Nicol state.
Figure 12B:
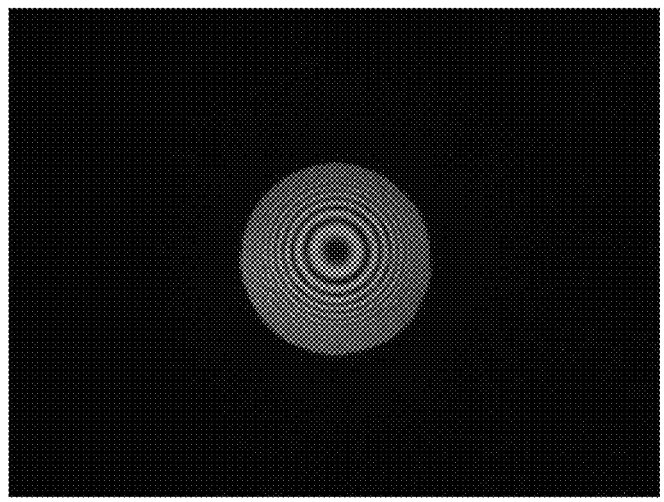
FIG. 12B is a conoscopic image observed when the polarizer and the analyzer are in the parallel Nicol state in the duplex Senarmont method by the lamellar bone observation microscope according to the first embodiment of the present invention.
Figure 12C:
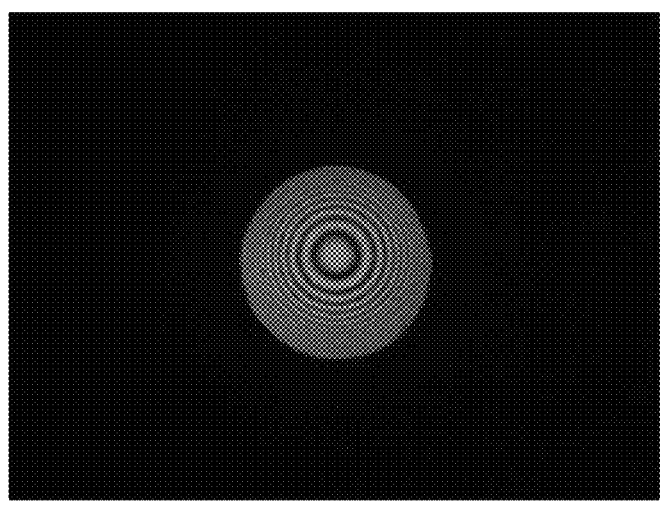
FIG. 12C is a conoscopic image observed when the polarizer and the analyzer are in the crossed Nicol state in the duplex Senarmont method by the lamellar bone observation microscope according to the first embodiment of the present invention.

FIG. 12A is a conoscopic image observed by the conventional polarization microscope when the polarizer 143 and the analyzer 154 are in the crossed Nicol state. FIG. 12B is a conoscopic image observed when the polarizer 143 and the analyzer 154 are in the parallel Nicol state in the duplex Senarmont method. FIG. 12C is a conoscopic image observed when the polarizer 143 and the analyzer 154 are in the crossed Nicol state in the duplex Senarmont method. In FIGS. 12A to 12C, calcite (uniaxial, negative crystal) is used as the sample. FIGS. 12A to 12C illustrate a conoscopic image of monochromatic light by a 546 nm filter.

As illustrated in FIGS. 12A to 12C, the retardation at a central portion becomes $\lambda$/2 as compared with the conoscopic image by the conventional crossed Nicol (see FIG. 12A), so that the observer knows that an extinguished fringe interval is $\lambda$ (see FIG. 12B). In FIG. 12B, the retardation of a first ring zone is A. In FIG. 12C, the retardation of a first ring zone is $\lambda$/2. Therefore, the conoscopic images are the same as a normal conoscopic image. Thus, the observer can observe a polarization interference image without isogyre.

Figure 13A:
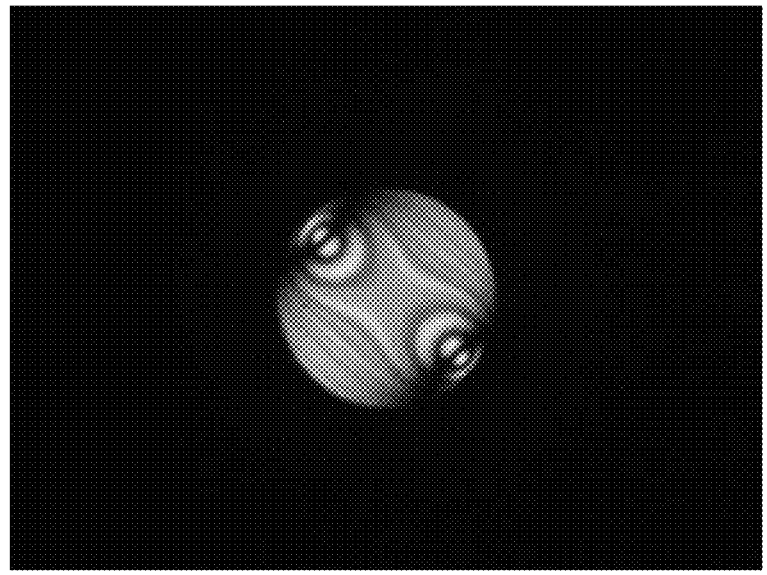
FIG. 13A is a conoscopic image observed by the conventional polarization microscope when the polarizer and the analyzer are in the crossed Nicol state.

FIG. 13A is a conoscopic image observed by the conventional polarization microscope when the polarizer 143 and the analyzer 154 are in the crossed Nicol state. FIG. 133 is a conoscopic image observed when the polarizer 143 and the analyzer 154 are in the parallel Nicol state in the duplex Senarmont method. In FIGS. 13A and 133, white mica (biaxial crystal) is used as the sample.

Figure 13B:
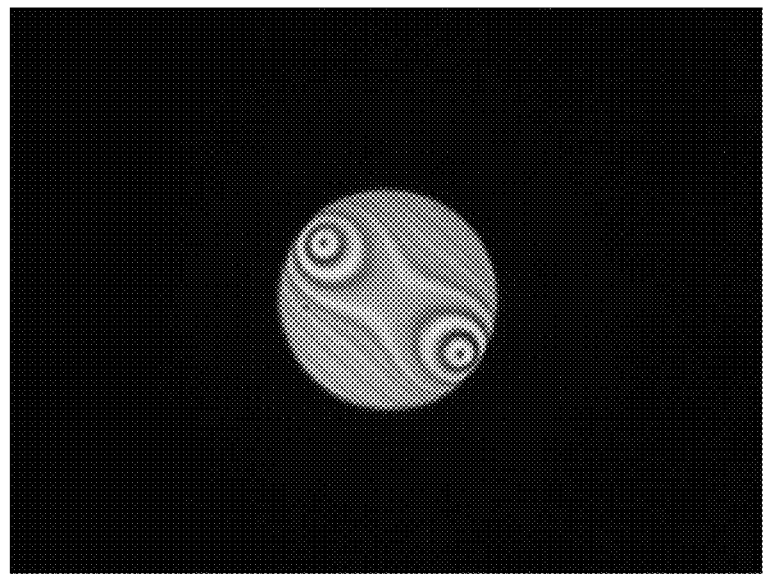
FIG. 13B is a conoscopic image observed when the polarizer and the analyzer are in the parallel Nicol state in the duplex Senarmont method.

As illustrated in FIGS. 13A and 13B, the observer can perform observation in which an image close to an optical axis in a biaxial crystal is different. Thus, the observer can observe a polarization interference image without isogyre. Further, also in a conoscopic image of monochromatic light by a 546 nm filter, it is possible to observe the same interference image as that in the case of calcite.

According to the first embodiment of the present invention described above, it is possible to easily visually recognize a lamellar structure of a bone section.

Further, according to the first embodiment of the present invention, when the polarizer 143 and the analyzer 154 are parallel Nicol, by fixedly arranging each of the first wave plate 144 and the second wave plate 153 in an addition direction, the entire retardation becomes 274 nm and the visual field can be a sensitive color. Therefore, when either one of the polarizer 143 and the analyzer 154 is slightly rotated, an anisotropic portion can be changed to a blue or yellow interference color.

Further, according to the first embodiment of the present invention, even when the rotation of each of the polarizer 143 and the analyzer 154 is smaller than 45 degrees from the reference position, the illumination side Senarmont compensator 16 and the observation side Senarmont compensator 17, which are vertically located, can be subtracted from each other, so that it is possible to adjust contrast of an observation image even at that position.

Further, according to the first embodiment of the present invention, it is possible to perform observation while the direction of the sample is maintained.

Further, according to the first embodiment of the present invention, it is possible to observe a sample having a minute retardation by a clear color contrast.

Further, according to the first embodiment of the present invention, under a condition in which circularly polarized light illumination and circularly polarized light detection are performed, the polarizer 143 and the analyzer 154 become the same as the sensitive color observation using a ½ wave plate under parallel Nicol, so that it is possible to perform highly-sensitive sensitive color observation. Therefore, it is possible to enhance contrast of the observation image when performing sensitive color observation.

Further, according to the first embodiment of the present invention, when performing conoscopic observation in a polarization state, it is possible to observe a polarization interference image without isogyre.

Modified Example of First Embodiment

Next, a modified example of the first embodiment of the present invention will be described. The same elements as those in the first embodiment described above are denoted by the same reference numerals and the explanation thereof will be omitted.

Figure 14:
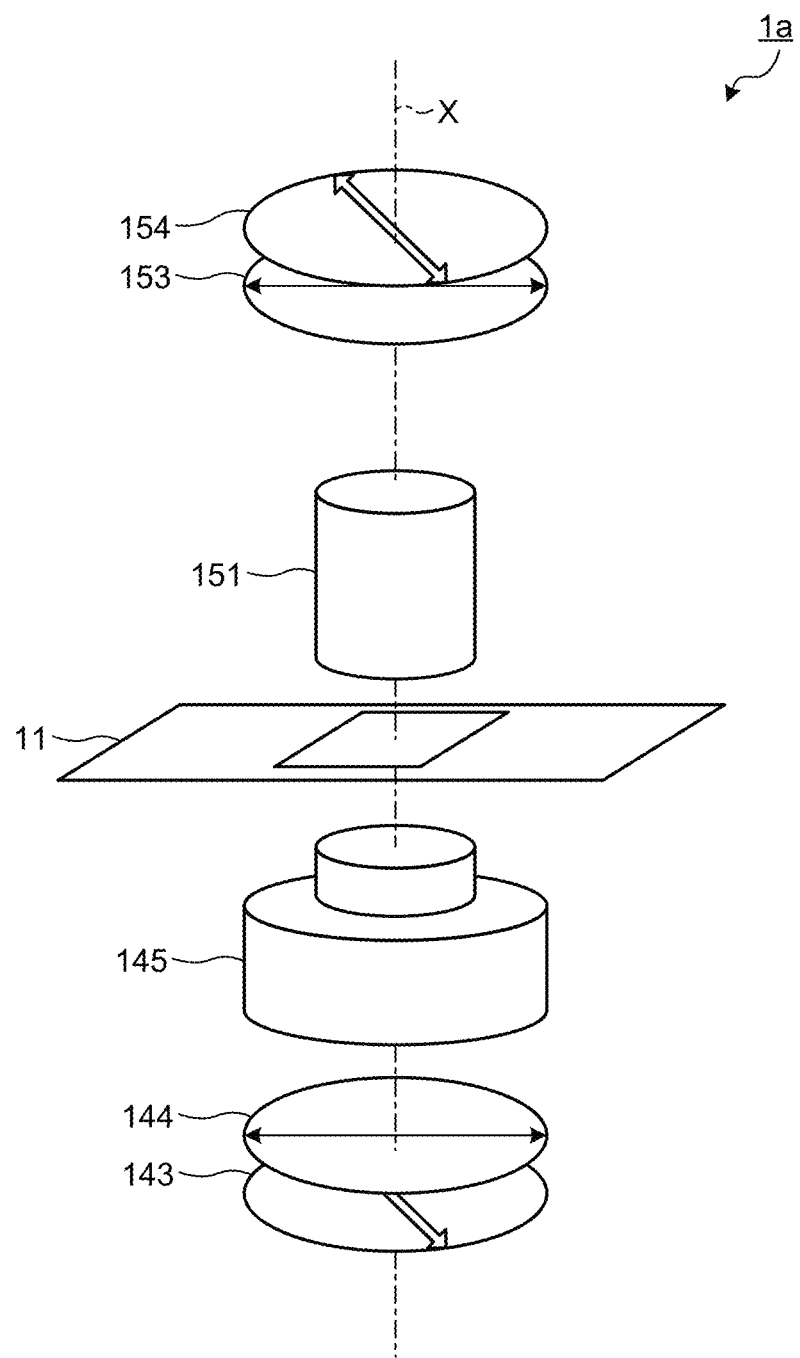
FIG. 14 is a schematic view illustrating a part of a lamellar bone observation microscope according to a modified example of the first embodiment of the present invention.

FIG. 14 is a schematic view illustrating a part of a lamellar bone observation microscope according to the modified example of the first embodiment of the present invention.

In a lamellar bone observation microscope 1a illustrated in FIG. 14, the polarizer 143 and the analyzer 154 are disposed such that the vibration directions of the polarizer 143 and the analyzer 154 are fixed in the parallel Nicol state. Specifically, the polarizer 143 and the analyzer 154 are fixedly arranged in a state in which the vibration directions of the polarizer 143 and the analyzer 154 are rotated by 45 degrees with respect to the optical axis X. Thus, a counter-clockwise rotation circularly polarizing plate can be formed by the polarizer 143 and the first wave plate 144, and a clockwise rotation circularly polarizing plate can be formed by the second wave plate 153 and the analyzer 154.

According to the modified example of the first embodiment, the same effect as that of the first embodiment described above is obtained and it is possible to easily visually recognize the lamellar structure of the bone section.

Second Embodiment

Next, a second embodiment of the present invention will be described. The same elements as those in the first embodiment described above are denoted by the same reference numerals and the explanation thereof will be omitted.

Figure 15:
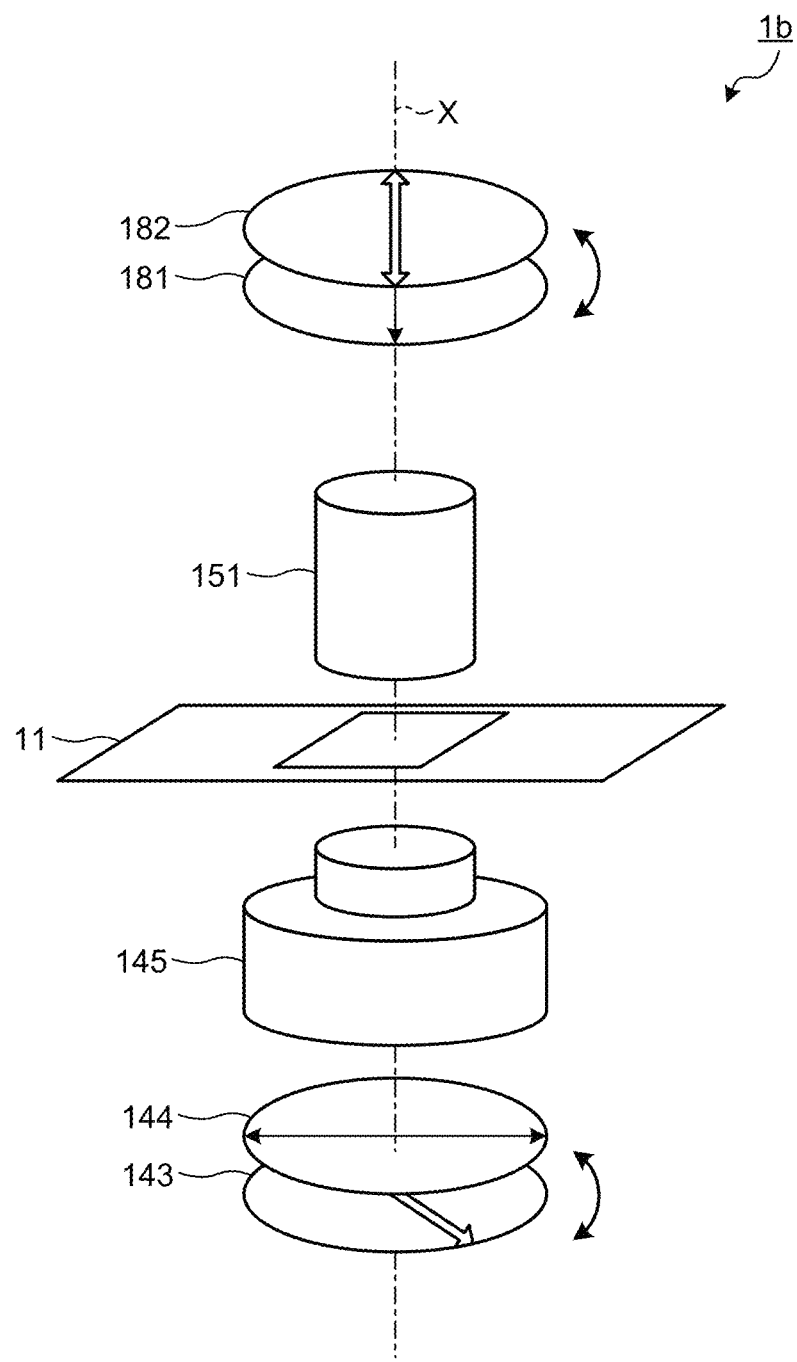
FIG. 15 is a schematic view illustrating a part of a lamellar bone observation microscope according to a second embodiment of the present invention.

FIG. 15 is a schematic view illustrating a part of a lamellar bone observation microscope according to the second embodiment of the present invention.

A lamellar bone observation microscope 1b illustrated in FIG. 15 includes a Broce-Kohler compensator 181 and an analyzer 182 instead of the second wave plate 153 and the analyzer 154, respectively, of the lamellar bone observation microscope 1 according to the first embodiment described above.

The Broce-Kohler compensator 181 is rotatable around the optical axis X of the condenser lens 145 and disposed on an optical path between the objective lens 151 and the analyzer 182. The Broce-Kohler compensator 181 changes retardation of the sample according to a relative positional relationship with the analyzer 182.

The analyzer 182 is disposed on an optical path on an observation side of the objective lens 151. The analyzer 182 passes only a polarization component in one direction of the light that has passed through the sample according to a relative positional relationship with the polarizer 143. The analyzer 182 is disposed to be fixed to the reference position (south-north direction).

Observation Procedure

Figure 16:
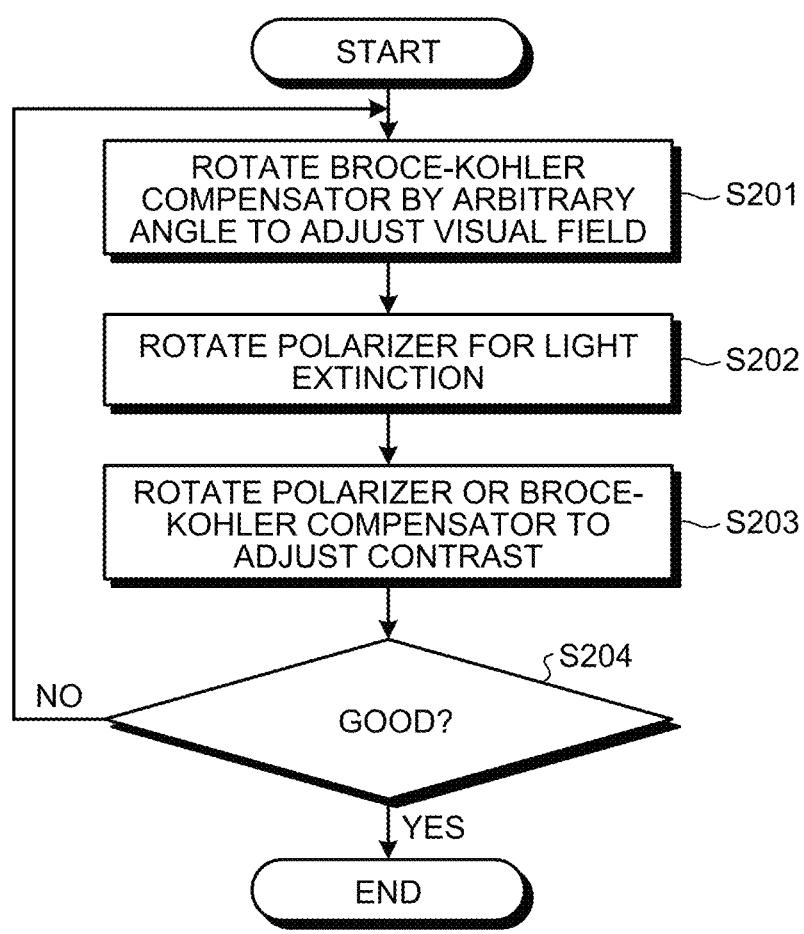
FIG. 16 is a flowchart illustrating an outline of an observation procedure by the lamellar bone observation microscope according to the second embodiment of the present invention.

Next, an observation procedure by the lamellar bone observation microscope 1b will be described. FIG. 16 is a flowchart illustrating an outline of the observation procedure by the lamellar bone observation microscope 1b.

As illustrated in FIG. 16, the observer rotates the Broce-Kohler compensator 181 by an arbitrary angle to adjust the visual field of the observation image so as to cause retardation of the sample (step S201). The maximum retardation of the Broce-Kohler compensator 181 is 55 nm.

Subsequently, the observer rotates the polarizer 143 for light extinction (step S202) and slightly rotates right and left the polarizer 143 or the Broce-Kohler compensator 181 from that position to adjust contrast of the observation image (step S203).

Thereafter, the observer determines whether or not the contrast of the observation image is good (step S204). When the contrast of the observation image is good (step S204: Yes), the observer ends the procedure and performs observation of the sample. On the other hand, when the contrast of the observation image is not good (step S204: No), the observer returns to step S201 described above.

According to the second embodiment of the present invention described above, the same effect as that of the first embodiment described above can be obtained and it is possible to easily visually recognize the lamellar structure of the bone section.

Other Embodiments

Although the exemplary microscope for observing the lamellar structure of the bone section has been described, this technique may be applied to imaging devices which have an objective lens for enlarging images of a specimen, an imaging function for capturing images of the specimen through the objective lens, and a display for displaying the captured images. Examples of such imaging devices include a video microscope.

Although the lamellar bone observation microscope described above uses transmitted-light illumination, some embodiments may employ epi-illumination. In this case, a prism for dividing light reflected from the sample may be provided on the optical path, and the illumination optical system and the observation optical system may be arranged on the optical path.

Some embodiments may be implemented in combination with another observation method such as a fluorescence microscopy.

In the explanation of the flowcharts, the processing sequence of steps is clarified by using the terms such as "first", "thereafter" and "subsequently". However, the sequence of the processing required to implement the present invention is not uniquely determined by these terms. That is to say, the sequence of the processing in the flowcharts described in the specification may be changed in a range without contradiction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lamellar bone observation microscope comprising:
a light source configured to emit light to irradiate a sample;
a condenser lens disposed on an optical path of the light and configured to focus the light emitted by the light source onto the sample;
an objective lens disposed on the optical path on an opposite side of the sample from the condenser lens;
a first polarizing plate disposed on the optical path between the light source and the condenser lens, the first polarizing plate being rotatable around an optical axis of the condenser lens and configured to pass only a polarization component in one direction of the light emitted by the light source;
a second polarizing plate disposed on the optical path on an output side of the objective lens, the second polarizing plate being rotatable around the optical axis of the condenser lens and configured to pass only a polarization component in one direction of the light that has passed through the sample in accordance with a relative positional relationship with the first polarizing plate;
a first wave plate disposed on the optical path between the first polarizing plate and the condenser lens and configured to introduce a phase difference of $\lambda/4$ in a $\gamma$ direction of a component of the light that has passed through the first polarizing plate; and
a second wave plate configured to introduce a phase difference of $\lambda/4$ in a $\gamma$ direction of a component of the light that has passed through the objective lens,
wherein the $\gamma$ directions of the first wave plate and the second wave plate are in parallel with each other, and
in a parallel Nicol state in which a vibration direction of the polarization component of the light passing through the first polarizing plate and a vibration direction of the polarization component of the light passing through the second polarizing plate are in parallel with each other, the first wave plate and the second wave plate are disposed on the optical path such that the $\gamma$ directions are inclined by an angle of 45 degrees with respect to each of the vibration direction of the first polarizing plate and the vibration direction of the second polarizing plate.

2. The lamellar bone observation microscope according to claim 1, wherein
one of the first polarizing plate and the second polarizing plate has information indicating an angle of the vibration direction with respect to the optical axis.

3. A lamellar bone observation microscope comprising:
a light source configured to emit light to irradiate a sample;
a condenser lens disposed on an optical path of the light and configured to focus the light emitted by the light source onto the sample;
an objective lens disposed on the optical path on an opposite side of the sample from the condenser lens;
a first polarizing plate disposed on the optical path between the light source and the condenser lens, the first polarizing plate being rotatable around an optical axis of the condenser lens and configured to pass only a polarization component in one direction of the light emitted by the light source;
a second polarizing plate disposed on the optical path on an output side of the objective lens and configured to pass only a polarization component in one direction of the light that has passed through the sample in accordance with a relative positional relationship with the first polarizing plate;
a first wave plate disposed on the optical path between the first polarizing plate and the condenser lens and configured to introduce a phase difference of $\lambda/4$ in a $\gamma$ direction of a component of the light that has passed through the first polarizing plate; and
a Broce-Kohler compensator disposed on the optical path between the objective lens and the second polarizing plate, the Broce-Kohler compensator being rotatable around the optical axis of the condenser lens and configured to change retardation of the sample in accordance with a relative positional relationship with the second polarizing plate,
wherein in a parallel Nicol state in which a vibration direction of the polarization component of the light passing through the first polarizing plate and a vibration direction of the polarization component of the light passing through the second polarizing plate are in parallel with each other, the first wave plate is disposed on the optical path such that the $\gamma$ direction is inclined by an angle of 45 degrees with respect to each of the vibration direction of the first polarizing plate and the vibration direction of the second polarizing plate.

* * * * *